Nov. 26, 1968 — V. K. ELORANTA ETAL — 3,412,664
PHOTOGRAPHIC APPARATUS FOR EXPOSING AND PROCESSING SHEET MATERIAL
Filed Jan. 3, 1966 — 4 Sheets-Sheet 1

Nov. 26, 1968   V. K. ELORANTA ETAL   3,412,664
PHOTOGRAPHIC APPARATUS FOR EXPOSING
AND PROCESSING SHEET MATERIAL
Filed Jan. 3, 1966                4 Sheets-Sheet 2

INVENTORS
Vaito K. Eloranta
Richard R. Wareham
Brown and Mikulka
Robert E. Cole
ATTORNEYS

United States Patent Office 3,412,664
Patented Nov. 26, 1968

3,412,664
PHOTOGRAPHIC APPARATUS FOR EXPOSING
AND PROCESSING SHEET MATERIAL
Vaito K. Eloranta, Needham, and Richard R. Wareham,
Marblehead, Mass., assignors to Polaroid Corporation,
Cambridge, Mass., a corporation of Delaware
Filed Jan. 3, 1966, Ser. No. 518,082
13 Claims. (Cl. 95—13)

ABSTRACT OF THE DISCLOSURE

A camera having a pair of pressure-applying members for superposing successive exposed areas of a photosensitive image-recording sheet with a second sheet and distributing a liquid between the sheets to form a sandwich. The camera has an opening adjacent the pressure-applying members through which successive lengths of the sandwich are withdrawn and a cutting device for severing each length of the sandwich from the remainder thereof. The camera has an arresting member for engaging successive spaced portions of one of the sheets to arrest further movement of the sandwich. The arresting member can be manually or automatically moved out of engagement with the sheets to permit further operation of the camera.

---

This invention relates to photographic apparatus for exposing successive areas of a photosensitive image-recording sheet and distributing a processing liquid in contact with each exposed area, and more particularly, to cameras of the self-developing type in which the image-recording sheet is advanced through and from the camera manually to effect exposure and processing thereof.

Cameras of the general type comprehended by the present invention are shown and described in copending U.S. applications of Vaito K. Eloranta, Ser. No. 409,248 filed Nov. 5, 1964, now patent No. 3,289,560 issued Dec. 6, 1966 and Ser. No. 488,356 filed Sept. 20, 1965. Cameras of this type include a pair of pressure-applying members for superposing successive exposed areas of the photosensitive image-recording sheet with a second sheet and distributing a processing liquid, contained, for example, in a rupturable container mounted on one of the sheets intermediate successive areas, between the sheets to form a sandwich during and in response to movement of the sheets between the pressure-applying members. The sandwich, thus formed, is moved directly from the camera through an opening adjacent the pressure-applying members and the part of the sandwich containing the exposed area is severed from other portions of the sheets remaining within the camera.

The sheets are advanced manually through the camera by the operator gripping the portions of the sheets (sandwich) projecting from the camera and remaining after the portion of the sandwich containing the exposed area has been severed therefrom. Accordingly, the camera also includes indexing means for controlling movement of the sheets through the camera to predeterminedly locate successive areas of the image-recording sheet in position for exposure and provide for withdrawal of successive predetermined lengths of the sheets between the pressure-applying members from the camera. The indexing means function to engage successive engageable portions of one of the sheets, usually holes in a margin thereof, predeterminedly associated with successive areas for arresting movement of the sheets, and means for releasing the sheets so that movement thereof can be resumed to locate another area in position for exposure and process an exposed area. The engagement portions of the sheets, e.g., holes, are located in the sections of the sheets between the successive areas and because these sections constitute waste, it is very desirable to keep their length to a minimum consistent with the requirement that, following severance of the sandwich, sufficient sheet material remains to provide a leader that may be gripped by the operator for withdrawing the next succeeding section of the sheet between the pressure-applying members.

An object of the invention is to provide in a self-developing camera of the type described, a novel and improved indexing mechanism providing for advancement of successive sections of, predetermined length and each containing an exposed area, of a photosensitive sheet between a pair of juxtaposed pressure-applying members to the furtherest possible extent and thereby provide the longest possible leader for gripping the sheet after severance of an end section thereof, including an exposed area, from the remainder of said sheet including the leader. This object is accomplished by arresting movement of the sheets with the leading end of an exposed area located as close as possible to the juxtaposed pressure-applying members consistent with providing a space for introducing or dispensing the processing liquid between the sheets ahead of the leading edge of the exposed area, for example, space for a rupturable container of processing liquid.

Other objects of the invention are: to provide an indexing mechanism as described for use in conjunction with a pair of pressure-applying members defining a convergent passage through which the sheets are moved for distributing the processing liquid and including means for engaging a sheet at substantially the narrowest part of the passage to arrest the movement of the sheets; and to provide an indexing mechanism of the type described including means for releasing the sheets for movement and preventing engagement of a sheet by the sheet arresting means until at least a predetermined length of the sheets has moved between the pressure-applying members.

Cameras of the type embodying the invention include means for severing the sandwich and/or preventing admission of light into the withdrawal opening. These means generally comprise a manually engageable member or members that must be moved during each exposure and processing cycle of the camera.

The invention has, as a further object, the provision in a camera of the type described of an indexing mechanism coupled with a manually movable member which functions to sever the sheets and/or prevent admission of light into the camera.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 7 is a sectional view similar to FIG. 4 taken substantially along the line 7—7 of FIG. 6 and illustrating the operation of the camera.

Figure 1:
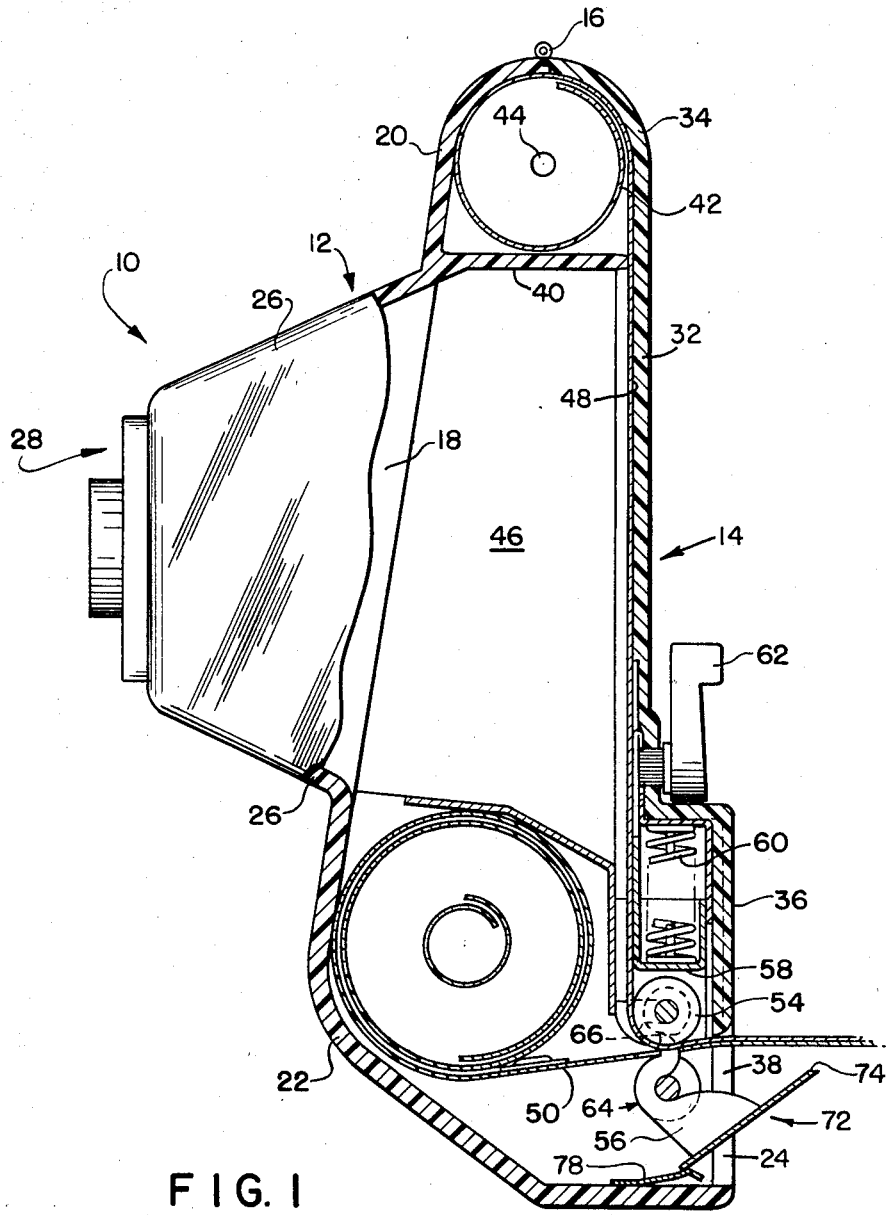
FIGURE 1 is an elevational, sectional view of a camera embodying the invention.

Reference is now made to FIG. 1 of the drawings wherein there is illustrated a camera 10 incorporating the indexing mechanism of the invention. Camera 10 includes a housing having a forward section 12 and a rear housing section 14 coupled with one another for pivotable movement with respect to one another about a hinge 16 located at one end of the camera housing to enable the camera to be loaded with the sheet materials required for producing photographs. The forward housing section includes side walls 18 and a forward wall including a first end portion 20 at which the forward housing section is coupled with the rear housing section, a second end portion 22 at the opposite end of the camera housing, a rear wall portion 24, and forwardly projecting sections 26, cooperating with the side walls for mounting a conventional lens and shutter assembly 28 and providing a chamber for transmitting light from the lens and shutter assembly toward the rear of the camera housing. Rear housing section 14 includes side walls 30 having forward edge portions which cooperate with rear edge portions of side walls 18 to provide a substantially light-type juncture; and a rear wall including a substantially planar rear portion 32, first end portion 34 at which the rear housing section is pivotably coupled with the forward housing section, and a second end wall portion 36 at the opposite end of the camera housing located rearwardly of rear wall portion 32. Rear wall portion 24 and second end wall portion 36 cooperate to define the sides of an opening 38 at the rear and adjacent one end of the camera housing through which successive sections of a sandwich comprising a photosensitive sheet and a second sheet are withdrawn from the camera housing.

The forward housing section includes an inner upper wall 40 cooperating with first end portions 20 and 34 and side walls 18 and 30 to provide a chamber for holding a supply of a photosensitive image-recording sheet 42 coiled around a spool 44. The forward housing section also includes inner side walls 46 extending rearwardly toward rear section 32 and having rear edge portions providing tracks 48 for locating and supporting successive areas of photosensitive sheet 42 in position for exposure to light from lens and shutter assembly 28.

The camera is adapted to be employed with photosensitive materials or film assemblages including, in addition to a photosensitive image-recording sheet, a second or image-receiving sheet 50 adapted, during processing, to be superposed with the image-recording sheet while a processing liquid is distributed between the sheets to form a sandwich. The photosensitive sheet may comprise a layer or layers of any of the photosensitive materials, such as silver halide, commonly used in photography, carried on a support sheet which is opaque to light actinic to the photosensitive material. The image-receiving sheet is substantially equal in width to the image-recording sheet, and in the preferred form is adapted to provide a support for image-forming substances transferred by diffusion from the image-recording sheet, and is also opaque to actinic light. The image-receiving sheet includes a succession of areas adapted to be superposed with exposed areas of the image-recording sheet during processing, and these areas, termed "image-receiving areas," are separated by intermediate sections of the sheet, on each one of which is mounted a rupturable container of processing liquid. Each intermediate section includes an engageable portion, preferably an opening 52, formed in a margin of the sheet and adapted to cooperate with the indexing mechanism of the invention. Each opening 52 and rupturable container of processing liquid are located as close as possible to the leading edge of an image-receiving area of second sheet 50, and the leading ends of the two sheets are coupled with one another so as to locate an image-receiving area in alignment with an exposed area of the photosensitive sheet when the two sheets are superposed and openings 52 are also predeterminedly located with respect to the hole-engaging component of the indexing mechanism so as to properly locate successive areas of the image-recording sheet in position for exposure.

Processing of each exposed area of the image-recording sheet to produce a photosensitive print is accomplished by a processing mechanism described in detail in copending application Ser. No. 488,356, and includes a pair of juxtaposed pressure-applying members in the form of rolls 54 and 56. Rolls 54 and 56 are mounted for rotation about axes lying substantially in a plane adjacent opening 38. Roll 54 is mounted at its ends on a support generally designated 58, mounted on second portion 36 of rear housing section 14 and biased toward roll 56 by a spring or springs 60. Roll 56 is mounted at its ends on a support mounted on the forward housing section 12 to permit threading of the sheets between the rolls when the housing sections are pivoted apart from one another during loading of the camera. The camera also includes a latch mechanism including an operating lever 62 described in detail in the last-mentioned application.

The rolls 54 and 56, in the operative position shown, cooperate to define a convergent passage into which sheets 42 and 50 are advanced into superposition. As the sheets are moved into the passage the processing liquid is spread between the sheets, for example, from a rupturable container mounted on the image-receiving sheet adjacent and ahead of the leading edge of an image-receiving area, to form a sandwich that is advanced directly from between rolls 54 and 56 through opening 38 and from the camera housing. During each exposure and processing cycle of the camera, the sheets are advanced a predetermined distance sufficient to locate the next succeeding area of the image-recording sheet in position for exposure, locate the leading edges of the image areas of the image-recording and image-receiving sheets as close as possible to the nip of the pressure-applying rolls, i.e., the narrowest part of the passage, and provide for advancement of the longest possible section of sandwich between the pressure-applying rolls. As previously noted, the sheet material intermediate exposure and image-receiving areas of the sheet, is considered to be waste material because no images are formed in these areas, but is necessary to provide space between successive areas in which the processing liquid may be introduced between the sheets, to provide portions engageable by the indexing mechanism and to provide leaders by which the sheets may be gripped for withdrawing successive areas between the pressure-applying members from the camera. In the operation of the camera of the invention, the portion of the sandwich containing an exposed area of the image-recording sheet and a superposed area of the image-receiving sheet is severed transversely from the remaining portion of the sandwich extending from between the pressure-applying members through opening 38, and in order to provide the longest possible leader for gripping the sandwich and resuming the withdrawal movement thereof consistent with minimizing the length of the sections of the sheets intermediate the image areas, the sandwich is severed as close as possible to the trailing edges of the image-containing areas of the sheets.

Figure 2:
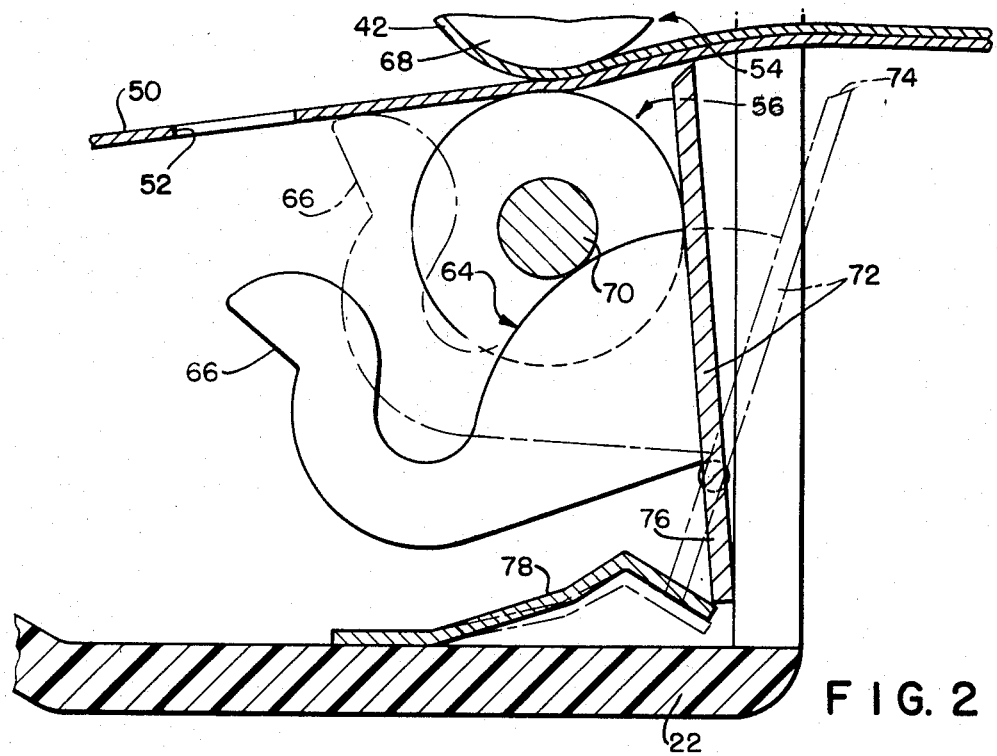
FIG. 2 is an enlarged fragmentary, sectional view illustrating the operation of the indexing mechanism of the camera.

In order to preserve the foregoing relationships the means for engaging the sheets to arrest the movement thereof are located as far along the path of movement of the sheets between the pressure-applying members as is possible, specifically at the narrowest part of the convergent passage between the pressure-applying members. The sheet engagement or arresting means of the invention are illustrated in FIGS. 1 and 2 as comprising an arresting member 64 having an end or engagement section 66 adapted to project into an opening 52 in second sheet 50 for arresting movement of the sheets. Rolls 54 and 56 include elongated sheet engaging sections, defining the convergent passage, for engaging and applying compressive pressure to at least the medial portions of the sheets in the regions thereof in contact with which the liquid is distributed, and aligned sections of reduced diameter at one end of the sheet engaging sections. The sections of reduced diameter may take the form of circumferential grooves in the rolls or merely shafts on which the rolls are mounted, and in FIG. 2, the sections of reduced diameter of rolls 54 and 56 are designated, respectively, 68 and 70. Arresting member 64 is planar and hook shaped so as to extend around section 70 of roll 56 to the narrowest portion of the passage between the rolls and across the passage into the recess provided by section 68 of reduced diameter of roll 54, in the operative or sheet arresting position of arresting member 64 shown in FIG. 1 in which engagement section 66 of the arresting member extends through an opening 52 in sheet 50 across the passage between the rolls.

The camera includes means for closing opening 38 in the camera housing to prevent admission of light through the opening and sever the sandwich along a transverse line at a predetermined distance from the narrowest part of the passage between the pressure-applying rolls. These sheet-severing and light sealing means, in the form shown in FIGS. 1 and 2, comprise a single door-like member termed a cutter bar 72, pivotally mounted near one of its longitudinal edges on support 59 adjacent the side of opening 38 closest rear wall portion 24. Cutter bar 72 is pivotable between an open position shown in FIG. 1 in which the cutter bar is operative to sever a sandwich along a predetermined transverse line, and a closed position shown in FIG. 2 in which the cutter bar extends across opening 38 closely adjacent roll 56. The longitudinal edge 74 of the cutter bar opposite the edge thereof closest its pivotable axis, is sharpened for severing the sandwich when the latter is drawn against this edge, and in the open position of the cutter bar, the sharpened edge is spaced a predetermined distance from the nip of the rolls to provide a leader by which the sandwich may be gripped. In the closed position of the cutter bar, edge 74 is located in engagement with the sandwich within opening 38 and cooperates with the sandwich for preventing admission of light through the opening. In the closed position of the cutter bar, the leader provided by the end portion of the sandwich extends from the camera housing past the cutter bar where it may be manually gripped for drawing the sheets between the pressure-applying rolls. As the sheets are drawn between the pressure-applying rolls to effect the processing thereof, frictional engagement between sheet 50 and sharpened edge 74 of the cutter bar causes the cutter bar to be pivoted from its closed position, shown in FIG. 2, toward its open position, shown in FIG. 1. The cutter bar includes a longitudinal edge section 76 located closely adjacent its pivotable axis opposite edge section 74 and a spring plate 78 is mounted on support 59 for engaging edge section 76 and functioning as a detent for resiliently retaining the cutter bar in its open and closed positions.

Arresting member 64 is mounted on cutter bar 72 or may, if desired, be formed as an integral part of the cutter bar, and is pivotable with the cutter bar between an inoperative position, shown in FIG. 2, in which engagement section 66 is located out of engagement with sheet 50, and an operative or arresting position, shown in FIG. 1, in which engagement section 66 extends across the passage and is engaged in an opening 52 in sheet 50. In the operative position of the cutter bar, hook-shaped portion of member 64 is engaged around section 70 of roll 56 establishing the open position of the cutter bar and preventing movement of engagement section 66 in the direction of movement of the sheets through the passage past the narrowest part of the passage, i.e., past the plane of the axes of the rolls. During the initial portion of advancement of the sheets between the pressure-applying members, the sharpened edge 74 of the cutter bar is engaged by the sheets pivoting the cutter bar to a position (shown in FIG. 2) intermediate its closed and open positions in which engagement section 66 of the cutter bar bears against sheet 50 near the entrance to the passage between the pressure-applying rolls. The cutter bar and arresting member remain in this intermediate position, although biased by spring 78 into their open or arresting position, until an opening 52 in sheet 50 becomes aligned with the engagement section and the latter enters the opening and is moved by the sheet into its arresting position. As engagement section 66 is moved by the sheet into and across the passage between the rolls, in the preferred form of the apparatus it punches a hole in sheet 42 so as to extend into the recess provided by reduced diameter section 68 of roll 54. The construction and arrangement of the arresting mechanism provides a safety feature which prevents tearing of the sheets or malfunction of the camera due to the improper operation of the camera by the operator, specifically, the failure of the operator to advance the sheets fully to a position in which engagement section 66 extends through opening 52 at the narrowest portion of the passage between the pressure-applying rolls. This may occur because of a suddenly increased resistance to movement of the sheets resulting, for example, from the engagement of a thicker portion (e.g., liquid trap or rupturable container) between the pressure-applying rolls. If movement of the sheets is discontinued before engagement section 66 is fully engaged within opening 52 at its arresting position, subsequent initiation of advancement of the sheets could result in engagement section 66 becoming immediately engaged in opening 52 during the initial portion of the advancement cycle when such engagement is completely unexpected, and could result in the operator continuing to advance the sheets causing them to tear. The arrangement shown and described insures that this cannot occur because a predetermined minimum length of the sheets must be advanced in engagement with sharpened edge 74 of the cutter bar in order to pivot engagement sections 66 into position for engagement with an opening 52 in the sheet, and this advancement length is sufficient in most instances to allow for movement of an opening 52, mistakingly thought to have been engaged by the arresting member, past engagement section 66 so that the opening cannot be engaged thereby.

Figure 3:
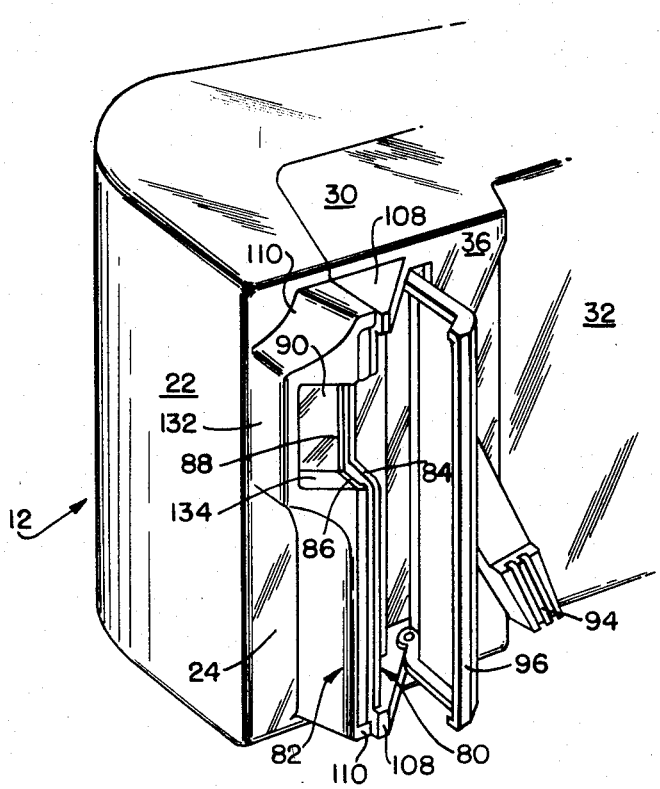
FIG. 3 is a fragmentary, perspective view of a portion of another embodiment of a camera incorporating the invention.
Figure 4:
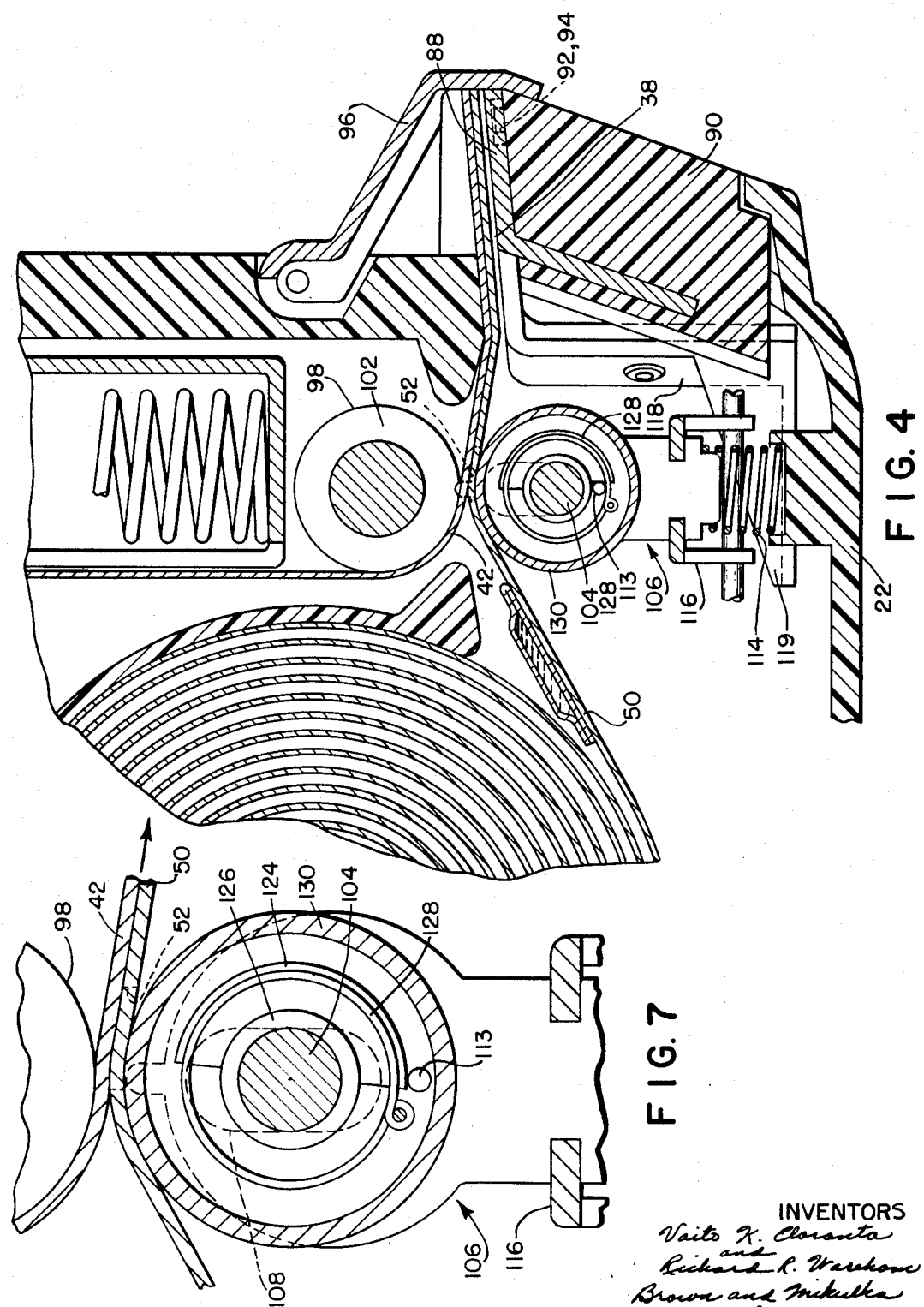
FIG. 4 is an enlarged fragmentary sectional view of the portion of the camera shown in FIG. 3.

Reference is now made to FIGS. 3 and 4 of the drawings wherein there is illustrated another embodiment of a camera incorporating an arresting mechanism in accordance with the invention. The camera shown is similar to camera 10 in most respects including construction of the housing and the processing means. The most significant distinction resides in the construction of the housing in the region of the opening through which the sandwich is withdrawn and the means for severing the sandwich and preventing admission of light into the withdrawal opening. In the form shown, second wall portion 36 of the rear housing section is provided with a rearwardly projecting lip 80 adjacent one side of opening 38, and rear wall portion 24 is provided with a rearwardly projecting lip adjacent the opposite side of opening 38. Lips 80 and 82 cooperate to provide a narrow passage through which the sandwich is withdrawn and prevent admission of light through opening 38 into the camera housing. The outer or rear edges of the lips are in substantial alignment with one another, and the sandwich is severed along a transverse line substantially aligned with the rear longitudinal edges of the lips. In order to enable the operator to grip the leading end portion of the sandwich disposed between the lips, lips 80 and 82 are provided, respectively, with aligned indentations 84 and 86. An elongated cutter bar 88 is mounted between the lips for pivotable movement in a plane, generally parallel with the plane of movement of the sandwich from an operative or cutting position in which a longitudinal sharpened edge of the cutter bar is disposed in alignment with the edges of the lips, the cutter bar extends across the indentations to provide a substantially continuous straight edge against which the sandwich may be drawn for severing the sandwich and indentation 86 in lip 82 is covered by the cutter bar preventing admission of light into the passage between the lips; and a depressed position (shown in FIG. 3), in which the portion of cutter bar 88 extending across indentation 86 is depressed inwardly to permit the sandwich to be gripped. A button 90 is mounted on the cutter bar for preventing admission of light and provides means which may be engaged by one of the fingers of the operator for depressing the cutter bar inwardly and forwardly when the operator introduces his fingers into the indentations to grip the sandwich.

The cutter bar is biased into its operative position by a spring and is retained in its operative position during severance of the sandwich by a small projection 92 on lip 82 that extends in a recess 94 in the cutter bar. The construction and arrangement of button 90 and the pivotable mounting of cutter bar 88 are such that manual engagement of the button to depress the cutter bar causes a slight deflection of the cutter bar sufficient to disengage projection 92 from recess 94 and permit the inward movement of the cutter bar. For details of the construction of the lips, cutter bar, and mounting of the cutter bar, reference should be had to the aforementioned application Ser. No. 488,356. A cover plate 96 may also be provided pivotably mounted on second portion 36 adjacent lip 80 for preventing admission of light into the camera housing through the passage between lips 80 and 82.

The camera includes a pair of pressure-applying rolls, designated 98 and 100, similar in construction and mounting to rolls 54 and 56. Roll 98 is provided with a circumferential recess 102 located at one end of the sheet engaging portion of the roll, and roll 100 includes a shaft 104 extending from the sheet engaging portion thereof. The arresting mechanism, illustrated in FIGS. 4 through 7, comprises an arresting member 106 including a slot 108 engaged around shaft 104 for limited movement in a radial direction with respect to the axis of rotation of the rolls toward and away from roll 98. Arresting member 106 includes a sheet engagement section or projection 110 at one end for engaging openings in the sheets, positioned to extend across the passage between rolls 98 and 100 into circumferential recess 102 in roll 98; and a T-shaped section 112 at its other end for engaging another element (to be described hereinafter) of the arresting mechanism. A stud 113 is provided, mounted on the side of arresting member 106 facing away from the sheet engaging portion of roll 100 adjacent the end of slot 108 furthest from projection 110, and extending in an axial direction with respect to roll 100. A spring 114 is provided for engaging T-shaped section 112 to bias arresting member 106 toward roll 98 so that as an opening 52 becomes aligned with engagement section 110, the engagement section enters the opening for arresting the movement of the sheets. A lever 116 pivotably mounted intermediate its ends is engaged with T-shaped section 112 of arresting member 106 for preventing rotation of the arresting member about shaft 104 on which it is mounted and withdrawing the arresting member against the bias of spring 114 from engagement with sheet 50 to permit resumption of advancement of the sheets between the pressure-applying rolls.

Figure 5:
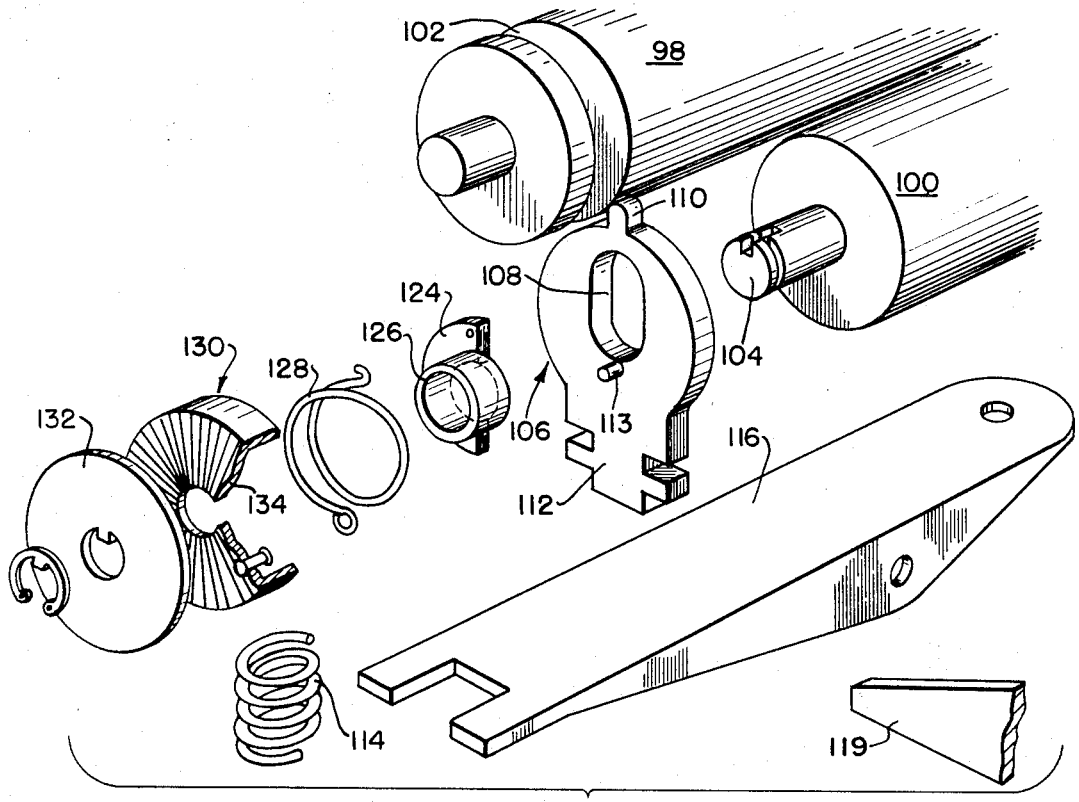
FIG. 5 is an exploded perspective view of components of the camera shown in FIG. 4.
Figure 6:
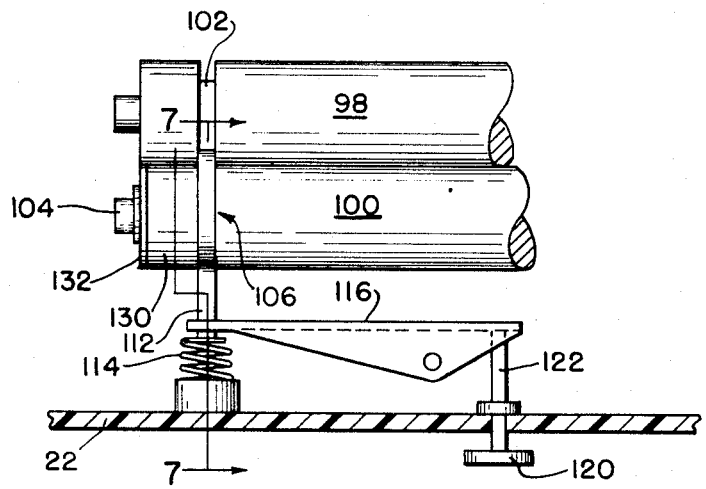
FIG. 6 is a fragmentary, elevational view illustrating a modified embodiment of components of the camera shown in FIG. 5.

Lever 116 can be manually actuated by a number of different means to withdraw the arresting member from engagement with sheet 50. For example, as shown in FIGS. 4 and 5, an arm 118 is mounted on cutter bar 88 for pivotable movement by the cutter bar and includes an inclined cam section 119 on one end for coacting with lever 116 to pivot the lever so as to withdraw engagement member 106 from engagement with sheet 50 when the cutter bar is pivoted inwardly by the operator in order to grip a portion of the sandwich within indentations 84 and 86 in lips 80 and 82. An alternative means for pivoting lever 116 to disengage the arresting member from a sheet may be quite simple and comprises a button 120, engageable outside of the camera housing, mounted on the outer end of a rod 122 extending through and engaged for sliding movement in second end portion 22 of the camera housing into engagement with the end of lever 116 opposite engagement member 106. In still another alternative embodiment, lever 116 may be coupled through an appropriate linkage with cover plate 96 so as to disengage the arresting member when the cover plate is moved manually to an open position to enable the operator to grip and withdraw the sandwich.

The arresting mechanism also includes means for retaining engagement section 110 of arresting member 106 out of engagement with sheet 50 until a predetermined length of the sandwich has been advanced between the pressure-applying rolls. These means comprise a cam 124 mounted for rotation coaxially with roll 100 on a sleeve 126 engaged around shaft 104; a torsion spring 128; a cylindrical cup 130 having an outer peripheral diameter approximately equal to the diameter of the sheet engaging portion of roll 100, mounted for rotation on shaft 104; and a ring 132 keyed to shaft 104 for rotation in response to rotation of the shaft. Cam 124 and cup 130 are mounted for rotation coaxially with roll 100 but independently thereof, and cup 130 includes a circular end section 134 formed with an opening in which shaft 104 is journaled and an end face adapted to bear against the face of ring 132 and make frictional contact with the ring tending to rotate cup 130 in response to rotation of roll 100 which, in turn, is rotated by and in response to engagement with the sheets during movement thereof between the rolls. Torsion spring 128 is coupled at one end with cam 124 and at its other end with cup 130 for rotating cam 124 (in a clockwise direction viewing FIGS. 4 and 7) during and in response to rotation of the cup and roll 100.

In the operation of the indexing mechanism, the sandwich is advanced between the pressure-applying rolls until engagement section 110 becomes engaged in an opening 52 in sheet 50. During advancement of the sandwich, roll 100 and cup 130 are rotated in a clockwise direction rotating cam 124 until the end of the cam comes to rest against stud 113, preventing further rotation of the cam while further tensioning torsion spring 128 until rotation of cup 130 is discontinued. The indexing mechanism remains in this condition (shown in FIG. 4) with the torsion spring under tension until arresting member 106 is moved radially with respect to roll 100. Stud 113 is moved radially outwardly with respect to cam 124 beyond the periphery of the cam freeing the cam to rotate slightly to the position shown in FIG. 7, in which the cam is located between stud 113 and shaft 104 preventing return movement of the engagement member under the bias of spring 114 into engagement with sheet 50. When movement of the sheets is resumed, cam 124 is rotated retaining the engagement member out of contact with sheet 50 until the trailing end of the cam is rotated past and from engagement with stud 113 allowing the engagement member to move into contact with the sheet. The length of the sandwich that is required to be advanced before the engagement member is permitted to engage the sheet is, of course, a function of the radial dimension of the cam and circumferential dimension of roll 100, and may be predetermined so as to insure that the opening 52, which was engaged or thought to be engaged with projection 110 on arresting member 106, has moved past the position of the projection and can no longer be engaged thereby.

It will be seen that in both embodiments of the apparatus disclosed, the sheet engaging member engages the sheets at the narrowest portion of the passage between the pressure-applying rolls and is prevented from reengaging opening in one of the sheets until a predetermined length of the sheets has been advanced between the pressure-applying rolls. The engagement means are controlled by means that are actuated by the operator in order to grip and/or move the sheets, preferably without the operator even realizing that he is releasing the sheets for continued movement. The operation of the camera is both simple and dependable and is achieved with an inexpensive construction.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic apparatus for exposing successive sections of a photosensitive sheet and distributing a processing liquid in contact with each of said sections, the combination comprising:
   a pair of pressure-applying members including juxtaposed sheet-engaging portions cooperating to provide a convergent passage through which a sheet is movable for distributing said processing liquid in contact with said sheet;
   an arresting member including an engagement section mounted for movement of said engagement section within said passage between said members to substantially the narrowest portion of said passage and, within said narrowest portion of said passage, across said passage toward and away from one of said pressure-applying members;
   means for preventing movement of said engagement section of said arresting member past the narrowest portion of said passage in the direction of movement of said sheet through said passage;
   means for moving said engagement section of said arresting member, within substantially the narrowest portion of said passage, toward said one pressure-applying member in one direction into engagement with said sheet within said passage to arrest movement of said sheet and for moving said arresting member in the opposite direction away from said one pressure-applying member from engagement with said sheet to permit movement thereof; and
   means responsive to movement of said sheet through said passage for retaining said arresting member out of engagement with said sheet during movement of a predetermined length of said sheet through said passage.

2. Photographic apparatus as defined in claim 1 including means mounting said arresting member for movement in opposite directions along a single predetermined path within said passage into and from engagement with said sheet within said passage.

3. Photographic apparatus as defined in claim 1 wherein said arresting member is mounted for movement of said engagement section across said passage at substantially the narrowest portion thereof only in a direction substantially perpendicular to the direction of movement of said sheet through said passage.

4. Photographic apparatus as defined in claim 1 including a sheet-severing member for aiding in the severance of sections of said sheet moved through said passage from other sections of said sheet within said passage, said sheet-severing member being movable between positions at which it is operative and inoperative to sever said sheet and being coupled with said arresting member for withdrawing said engagement section of said arresting member from engagement with said sheet within said passage.

5. Photographic apparatus as defined in claim 1 including a housing having an opening through which said sheet is movable from between said pressure-applying members and a light sealing member movably mounted on said housing coupled with said arresting member for withdrawing said engagement section thereof from engagement with said sheet in response to movement of said light sealing member.

6. Photographic apparatus for distributing a processing liquid in contact with successive sections of a photographic sheet comprising, in combination:
   a pair of pressure-applying members including juxtaposed sheet-engaging portions cooperating to provide a convergent passage through which a sheet is movable for distributing said processing liquid in contact with said sheet;
   at least one of said pressure-applying members comprising a roll mounted for rotation about a longitudinal axis and including a circumferential recess adjacent an end of said sheet-engaging portion thereof;
   an arresting member for engaging successive portions of said sheet to arrest movement thereof;
   said arresting member including an engagement portion located within said recess in said passage between said roll and the other of said pressure-applying members and being mounted for movement of said engagement portion within said recess to substantially the narrowest portion of said passage and, within the narrowest portion of said passage, across said passage toward and away from said other pressure-applying member and transverse to the direction of movement of said sheet through said passage;
   means for preventing movement of said engagement portion of said arresting member past the narrowest portion of said passage in the direction of movement of said sheet through said passage;
   means for moving said engagement portion of said arresting member within the narrowest portion of said passage in one direction toward said other pressure-applying member into engagement with said sheet within said passage;
   means for moving said engagement portion of said arresting member in the reverse direction away from said other pressure-applying member out of engagement with one of said portions of said sheet to permit the continued movement of said sheet through said passage; and
   means responsive to movement of said sheet through said passage for retaining said engagement portion of said arresting member out of engagement with said one portion of said sheet during movement of a predetermined length of said sheet through said passage.

7. Photographic apparatus as defined in claim 6 wherein said arresting member is mounted for movement of said engagement portion in opposite directions along a single predetermined path within said passage into and from engagement with said portions of said sheet within said passage.

8. Photographic apparatus as defined in claim 7 wherein said arresting member is mounted for movement of said engagement portion within said recess toward and away from said other pressure-applying member in a direction substantially perpendicular to the direction of movement of said sheet through said passage between said pressure-applying members.

9. Photographic apparatus as defined in claim 6 comprising sheet-severing means for severing successive sections of said sheet following movement thereof through said passage, from other sections of said sheet located within said passage between said pressure-applying members, and wherein said sheet-severing means are manually movable between different positions and said means for moving said engagement portion of said arresting member out of engagement with said sheet are coupled with said sheet-severing means for operation thereby.

10. Photographic apparatus as defined in claim 9 wherein said sheet-severing means are movable from one of said positions to another by engagement with said sheet during movement thereof and said means for moving said engagement portion of said arresting member toward said other pressure-applying member into engagement with said sheet are coupled with said sheet-severing member for moving said engagement portion into engagement with said sheet in response to movement of said sheet in engagement with said sheet-severing means.

11. Photographic apparatus as defined in claim 6 wherein said means for retaining said engagement portion of said arresting member out of engagement with said sheet are coupled with said roll for releasing said arresting member to return to engagement with said sheet in response to rotation of said roll by engagement with said moving sheet.

12. Photographic apparatus as defined in claim 6 including a housing having an opening through which said sheet is movable from between said pressure-applying members and manually engageable means movably mounted on said housing for preventing admission of light into said housing through said opening, the last-mentioned means being coupled with said arresting member for withdrawing the latter from engagement with said sheet in response to movement of said last-mentioned means.

13. Photographic apparatus as defined in claim 12 wherein said last-mentioned means are coupled with said arresting member to move said arresting member into engagement with said sheet in response to movement of said sheet in engagement with said last-mentioned means.

References Cited

UNITED STATES PATENTS

| | | | |
|---|---|---|---|
| 3,113,497 | 12/1963 | Eloranta | 95—13 |
| 3,289,560 | 12/1966 | Eloranta | 95—13 |

NORTON ANSHER, *Primary Examiner.*

FRED L. BRAUN, *Assistant Examiner.*